(12) United States Patent
Du et al.

(10) Patent No.: US 8,681,724 B2
(45) Date of Patent: Mar. 25, 2014

(54) DISCONTINUOUS RECEPTION IN CARRIER AGGREGATION WIRELESS COMMUNICATION SYSTEMS

(75) Inventors: Lei Du, Beijing (CN); Min Huang, Beijing (CN); Yong Teng, Beijing (CN)

(73) Assignee: Nokia Siemens Networks Oy, Espoo (FI)

(*) Notice: Subject to any disclaimer, the term of this patent is extended or adjusted under 35 U.S.C. 154(b) by 200 days.

(21) Appl. No.: 13/143,464

(22) PCT Filed: Jan. 7, 2009

(86) PCT No.: PCT/EP2009/050134
§ 371 (c)(1),
(2), (4) Date: Jul. 6, 2011

(87) PCT Pub. No.: WO2010/078962
PCT Pub. Date: Jul. 15, 2010

(65) Prior Publication Data
US 2011/0267957 A1  Nov. 3, 2011

(51) Int. Cl.
*H04W 4/00* (2009.01)

(52) U.S. Cl.
USPC .................. 370/329; 370/311; 455/509

(58) Field of Classification Search
USPC ........................................................ 370/241
See application file for complete search history.

(56) References Cited

U.S. PATENT DOCUMENTS

| 2008/0186892 A1 | 8/2008 | Damnjanovic | 370/311 |
| 2011/0002281 A1* | 1/2011 | Terry et al. | 370/329 |

OTHER PUBLICATIONS

3GPP TS 36.300 V8.6.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", Sep. 2008, 137 pages.
R1-083730, 3GPP TSG-RAN WG1 Meeting #54bis, "L1 Control Signaling with Carrier Aggregation in LTE-Advanced", Nokia, Nokia Siemens Networks, Prague, Czech Republic, Sep. 29-Oct. 3, 2008, 6 pgs.
R1-084424, 3GPP TSG RAN1#55, "Control Channel Design Issues for Carrier Aggregation in LTE-A", Motorola, Prague, Czech Republic, Nov. 10-14, 2008, 4 pgs.

* cited by examiner

*Primary Examiner* — Huy D Vu
*Assistant Examiner* — Kevin Cunningham
(74) *Attorney, Agent, or Firm* — Harrington & Smith

(57) ABSTRACT

A communication system is presented, which is capable of sending a transmission over an interface having at least two aggregated component carriers including a primary component carrier and at least one secondary component carrier, wherein the primary component carrier has a physical downlink control channel (PDCCH) associated therewith and wherein the PDCCH is capable of signaling allocations for the primary component carrier and the at least one secondary component carrier. A method of operating a network element including sending to a user equipment a transmission indication indicative of the transmission in the PDCCH of the primary component carrier. A method of operating a user equipment includes monitoring downlink control signaling for a transmission indication indicative of a transmission to the user equipment only on the PDCCH of the primary component carrier.

20 Claims, 4 Drawing Sheets

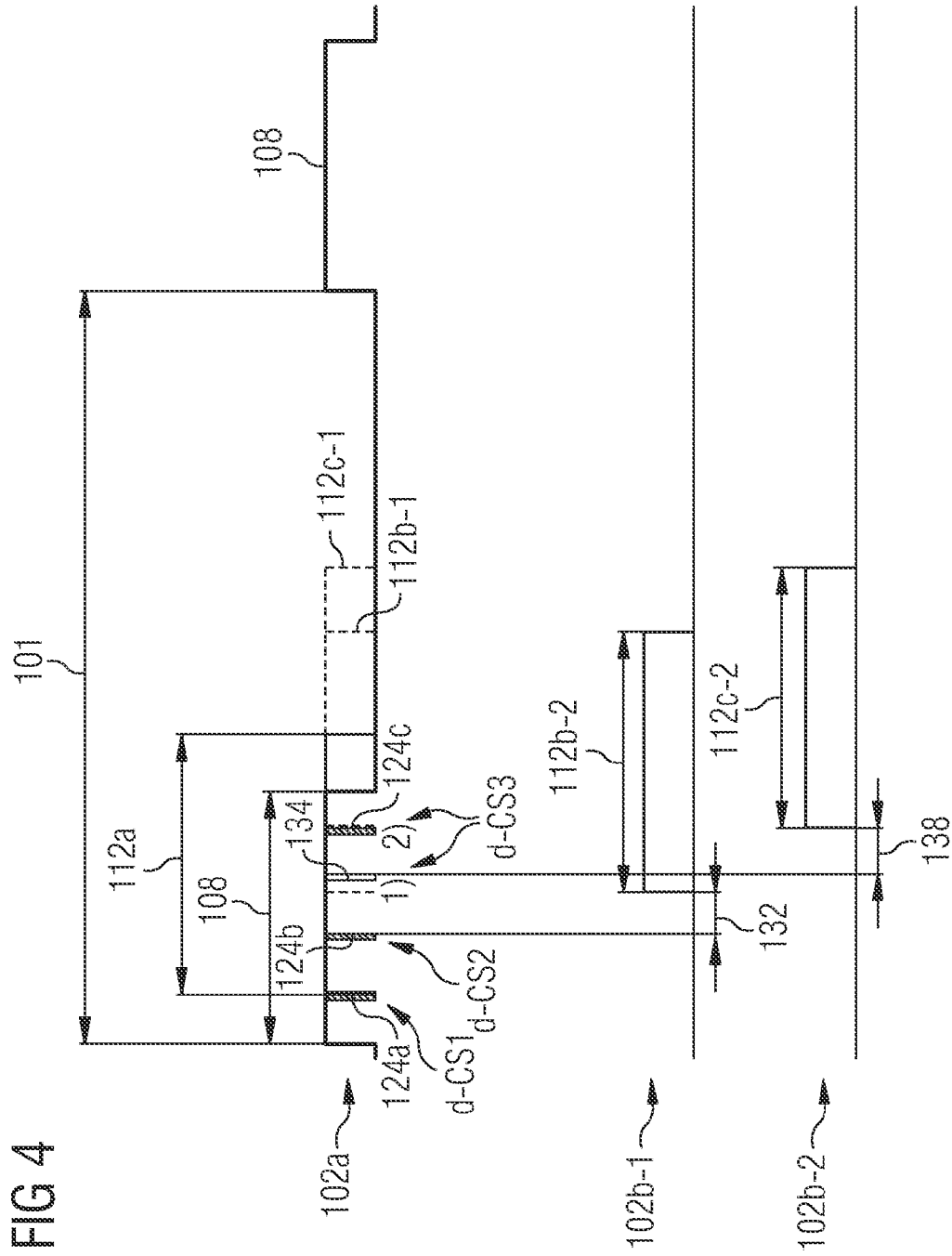

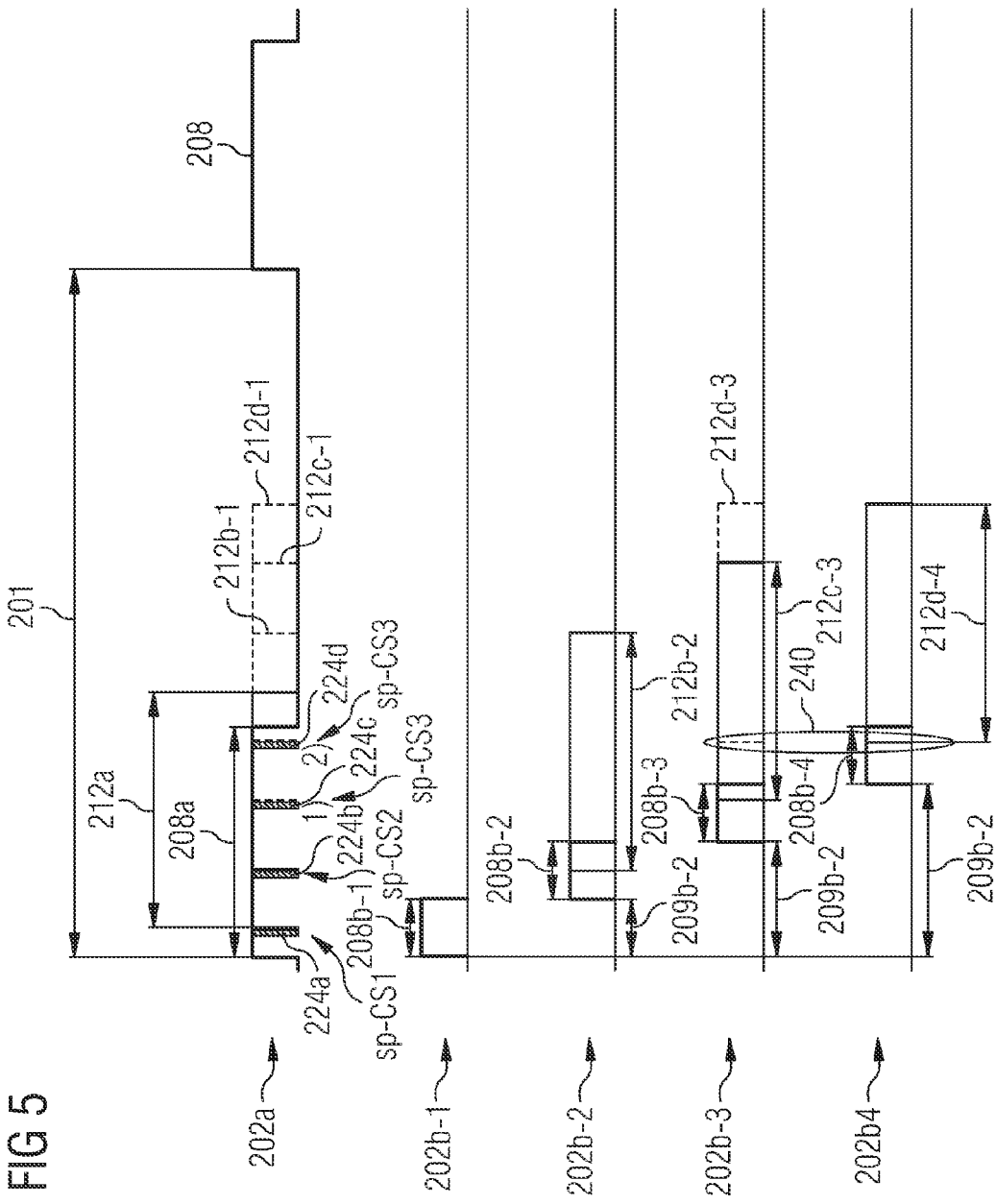

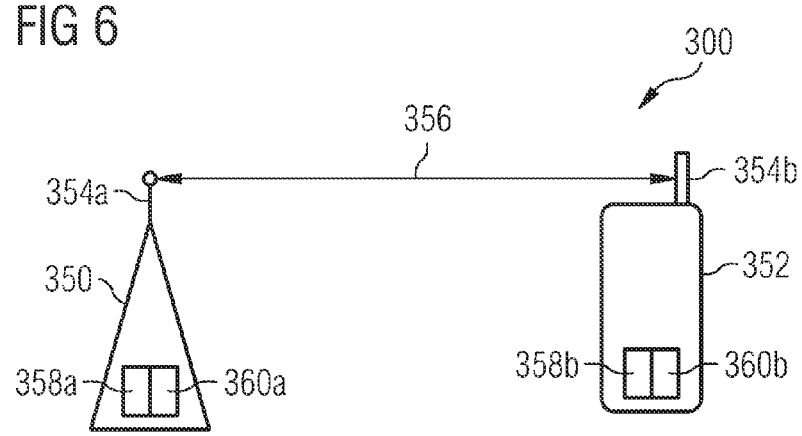

DISCONTINUOUS RECEPTION IN CARRIER AGGREGATION WIRELESS COMMUNICATION SYSTEMS

FIELD OF INVENTION

The present invention relates to the field of wireless communication and in particular to the field of carrier aggregation in wireless communication.

ART BACKGROUND

In order to achieve higher peak data rates, it has been proposed operate in spectrum allocations of different sizes including wider spectrum allocations than e.g. those of Release 8 LTE (LTE=Long Term Evolution), e.g. up to 100 MHz, e.g. to achieve the peak data rate of 100 Mbit/s for high mobility and 1 Gbit/s for low mobility. Moreover, backward compatibility is desirable.

A possible measure for achieving wider spectrum allocations is carrier aggregation, where two or more component carriers are aggregated, as it is considered for LTE-Advanced in order to support downlink transmission bandwidths larger than 20 MHz.

A user equipment (UE), e.g. a terminal, may simultaneously receive one or multiple component carriers depending on its capabilities:

- An LTE-Advanced terminal with reception capability beyond 20 MHz can simultaneously receive transmissions on multiple component carriers.
- An LTE Rel-8 terminal can receive transmissions on a single component carrier only, provided that the structure of the component carrier follows the Rel-8 specifications.

FIG. 1 gives an example of the carrier aggregation of an LTE Advanced System. M Rel8 bandwidth "chunks", or component carriers 2, indicated with C1, C2, C3, C4 and C5 over frequency f in FIG. 1, are combined together to form M×Rel8 Bandwidth 4, e.g. 5×20 MHz=100 MHz, given M=5, for the system illustrated in FIG. 1. In the illustrated example, Rel'8 terminals receive/transmit on one component carrier, whereas LTE-Advanced terminals may receive/transmit on multiple component carriers simultaneously to reach the higher bandwidths, e.g. an LTE Advanced maximum bandwidth 4 of 100 MHz, as shown in FIG. 1.

On the other hand, besides higher peak data rates, power consumption is an important issue.

In view of the above-described situation, there exists a need for an improved technique that enables carrier aggregation, while substantially avoiding or at least reducing one or more of the above-identified problems.

SUMMARY OF THE INVENTION

This need may be met by the subject matter according to the independent claims. Advantageous embodiments are described by the dependent claims.

Aspects of the herein disclosed subject matter are based on the idea to implement a concept of discontinuous reception DRX on a system capable of carrier aggregation. In order to reduce power consumption, it is proposed to introduce to carrier aggregation system a concept of discontinuous reception wherein the user equipment and a network element negotiate time intervals in which data transfer happens. Outside these time intervals, the user equipment turns its receiver off and enters a low power state.

According to a first aspect of the herein disclosed subject matter there is provided a method of operating a network element capable of sending a transmission over an interface having at least two aggregated component carriers including a primary component carrier and at least one secondary component carrier, the primary component carrier having a physical downlink control channel (PDCCH) associated therewith, wherein the PDCCH is capable of signaling allocations for the primary component carrier and the at least one secondary component carrier.

Examples of a user equipment (referred to as UE hereinafter) include but are not limited to a mobile phone, a mobile computer, etc. Examples of a network element include but are not limited to a base station of a wireless communications network, e.g. an e-nodeB.

According to an embodiment, the method according to the first aspect comprises sending to a UE a transmission indication indicative of the transmission in the PDCCH of the primary component carrier.

According to a further embodiment, an on-duration timer is configured only on the primary component carrier, e.g. by respective signaling of the network element to the user equipment. The on-duration indicating the time duration the user equipment monitors the PDCCH for allocations. According to a further embodiment the offsets of the on-duration are configured by radio resource control (RRC) signaling. Thus the power consumption can be decreased.

According to a further embodiment the PDCCH on primary component carrier is capable of configuring the transmission in the following subframes, i.e. the subframes which follow the subframe wherein the PDCCH is transmitted. The method according to the first aspect may be configured accordingly. For example, according to a further embodiment, the method according to the first aspect may further comprise defining a timing gap between, in the UE, successful decoding of the transmission indication and starting of an inactivity timer on a secondary component carrier, the inactivity timer indicating the time duration the UE at least waits until deactivating reception on the component carrier associated with the inactivity timer. According to an embodiment, defining such a timing gap is performed by sending to a UE a timing gap message for configuring the UE to impose the timing gap between the successful decoding of the transmission indication and the starting of an inactivity timer on a secondary component carrier.

Herein, a subframe is a basic timing unit of radio resource, e.g. of radio resource in LTE frame structure. For example, according to an illustrative embodiment, downlink and uplink transmissions are organized into radio frames with a predefined duration, e.g. with 10 ms duration as defined in 3GPP TS 36.300 V8.6.0 (September 2008). Each radio frame is divided into a predefined number of equally sized subframes. Each subframe may consist of a further predefined number of equally sized slots. For example, according to TS 36.300 V8.6.0, for frequency division duplexing (FDD), 10 subframes are available for downlink transmission and 10 subframes are available for uplink transmissions in each 10 ms interval and each subframe consists of two slots. Uplink and downlink transmissions are separated in the frequency domain. According to other embodiments, e.g. where the UE has a preconfigured timing gap between the successful decoding of the transmission indication and the starting of an inactivity timer on a secondary component carrier, no such timing gap message is sent by the network element to the UE.

According to a further embodiment the PDCCH on primary component carrier is not capable of configuring the transmission in the following subframes. For example, the PDCCH on the primary component carrier may be capable of configuring the transmission only in subframe of the PDCCH. The method according to the first aspect may be configured accordingly. For example, according to a further embodiment the method further comprises (a) sending to a UE a reception preparation message indicating the requirement of preparing at least one secondary component carrier for signal reception thereon; and (b) sending the transmission indication on the primary component carrier and starting the inactivity timer on the secondary component carrier. Hence, according to an embodiment wherein the PDCCH on the primary component carrier can only configure the transmission in the same subframe, a two-step signaling from the network element to the user equipment is executed, i.e. steps (a) and (b) are carried out in two sequent subframes.

According to a further embodiment, on-duration is configured on at least one secondary component carrier. The on-duration indicating the time duration the user equipment monitors the PDCCH for allocations or stays awake for possible downlink data transmission. For example, on-duration may be configured on every secondary component carrier. Hence, according to these embodiments, no timing gap between PDCCH indication and data transmission is needed.

For example, according to a still further embodiment of the first aspect, the method further comprises signaling to the UE offsets of on-duration of the primary component carrier and the at least one second component carrier.

According to a second aspect of the herein disclosed subject matter, a network element is configured for carrying out the method according to one or more of the embodiments of the first aspect.

According to a third aspect of the herein disclosed subject matter there is provided a method of operating a user equipment capable of receiving a transmission over an interface having at least two aggregated component carriers of which a primary component carrier has a physical downlink control channel (PDCCH) associated therewith, the PDCCH capable of signaling allocations for the primary component carrier and at least one secondary component carrier.

According to an embodiment of the third aspect, the method comprises monitoring downlink control signaling for a transmission indication indicative of a transmission to the user equipment only on the PDCCH of the primary component carrier.

According to a further embodiment of the third aspect, the user equipment is capable of receiving the transmission on at least one secondary component carrier in a following subframe which follows a subframe in which the transmission indication was sent (subframe of the PDCCH). According to a further embodiment, the method of the third aspect is configured accordingly. For example, according to a further embodiment, the method further comprises imposing a timing gap between successful decoding of the transmission indication and starting of an inactivity timer, the inactivity timer indicating the duration that the UE at least waits until deactivating reception on the component carrier associated with the inactivity timer.

According to a further embodiment, the timing gap is defined by a timing gap message transmitted by a network element.

According to a further embodiment, the timing gap is defined by a timing gap duration value stored in the user equipment.

According to a further embodiment, the method according to the third aspect comprises (a) receiving on the primary component carrier a message indicating the preparation of signal reception on at least one of the at least one secondary component carrier; and (b) receiving the transmission indication on the primary component carrier, e.g. on the PHCCH of the primary component carrier.

According to a further embodiment, only the primary component carrier is configured with an on-duration timer defining a time duration during which the user equipment monitors the PDCCH for allocations.

According to a still further embodiment, the primary component carrier and at least one of the at least one secondary component carrier is configured with an on-duration timer. According to an embodiment, the on-duration timer defines a time duration during which the user equipment monitors the PDCCH for allocations or stays awake for possible downlink data transmission. According to a further embodiment, the range of on-duration on the primary component carrier covers all on-duration ranges of on-duration on the at least one secondary component carrier.

According to a still further embodiment, the method according to the third aspect further comprises starting an inactivity timer on a secondary component carrier only within an active time on the secondary component carrier, wherein the inactivity timer indicates the time duration the UE at least waits until deactivating reception on the component carrier associated with the inactivity timer.

According to a still further embodiment, the active time indicates the time duration which includes on-duration and inactivity timer. For example, according to an embodiment the active time indicates the time duration wherein either the on-duration timer or the inactivity timer is running.

According to a fourth aspect of the herein disclosed subject matter, a user equipment (UE) is provided which is configured to carry out the method according to the third aspect or an embodiment thereof.

According to a fifth aspect, a computer program is provided which, when being executed by a data processor, is adapted for controlling a method according to the first aspect or an embodiment thereof.

According to a sixth aspect, a computer program is provided which, when being executed by a data processor, is adapted for controlling a method according to the third aspect or an embodiment thereof.

In the following there will be described exemplary embodiments of the subject matter disclosed herein with reference to a method for operating a user equipment and a method for operating a network element. It has to be pointed out that of course any combination of features relating to different aspects of the herein disclosed subject matter is also possible. In particular, some embodiments are described with reference to apparatus type claims whereas other embodiments are described with reference to method type claims. However, a person skilled in the art will gather from the above and the following description that, unless other notified, in addition to any combination of features belonging to one aspect also any combination between features relating to different aspects or embodiments, for example even between features of the apparatus type claims and features of the method type claims is considered to be disclosed with this application.

Further, a person skilled in the art will gather from the above and the following description that, unless other notified, in addition to any combination of features belonging to one aspect also any combination between features relating to different aspects or embodiments, for example even between features relating to a network element and features relating to a user equipment is considered to be disclosed with this application. In particular the skilled person will gather from the herein disclosed subject matter that e.g. settings in the UE may be configured by respective signaling of the network element to the UE. Herein, the wording "starting a timer" includes "starting a timer for the first time" as well as "restarting a timer".

The aspects defined above and further aspects are apparent from the examples of embodiment to be described hereinafter and are explained with reference to the examples of embodiment. The herein disclosed subject matter will be described in more detail hereinafter with reference to examples of embodiment given in the detailed description but to which the herein disclosed subject matter is not limited.

BRIEF DESCRIPTION OF THE DRAWINGS

FIG. 4 shows an exemplary illustration of a procedure of dynamic DRX design.

FIG. 5 shows an exemplary illustration of a procedure of semi-persistent DRX design.

FIG. 6 shows an exemplary illustration of a system comprising elements according to an embodiment of the present invention.

DETAILED DESCRIPTION

Figure 1:
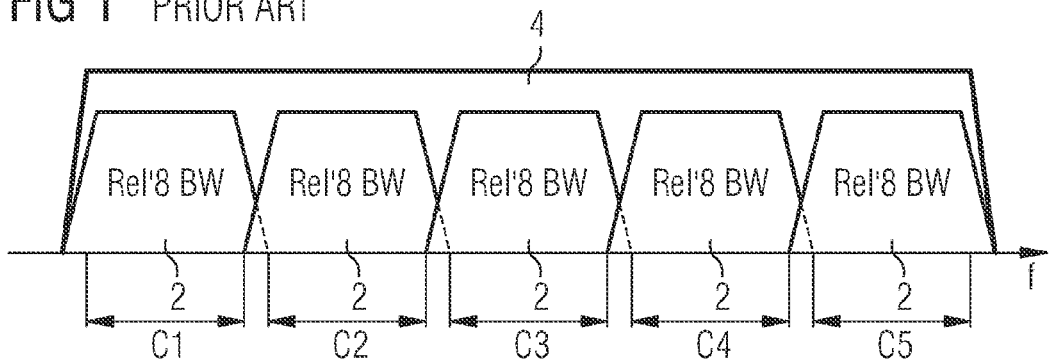
FIG. 1 illustrates carrier aggregation in a long-term evolution advanced (LTE-A) system.

The illustration in the drawings is schematic. It is noted that in different figures, similar or identical elements are provided with the same reference signs or with reference signs, which are different from the corresponding reference signs only within the first digit or within an appendix starting with a character.

One aspect of the herein disclosed subject matter is to implement a concept of discontinuous reception DRX on a system capable of carrier aggregation. For an LTE (Long Term Evolution) system an example of a DRX scheme has been proposed by the third generation partnership project (3GPP) in TS 36.300 V8.6.0 (September 2008).

Figure 2:
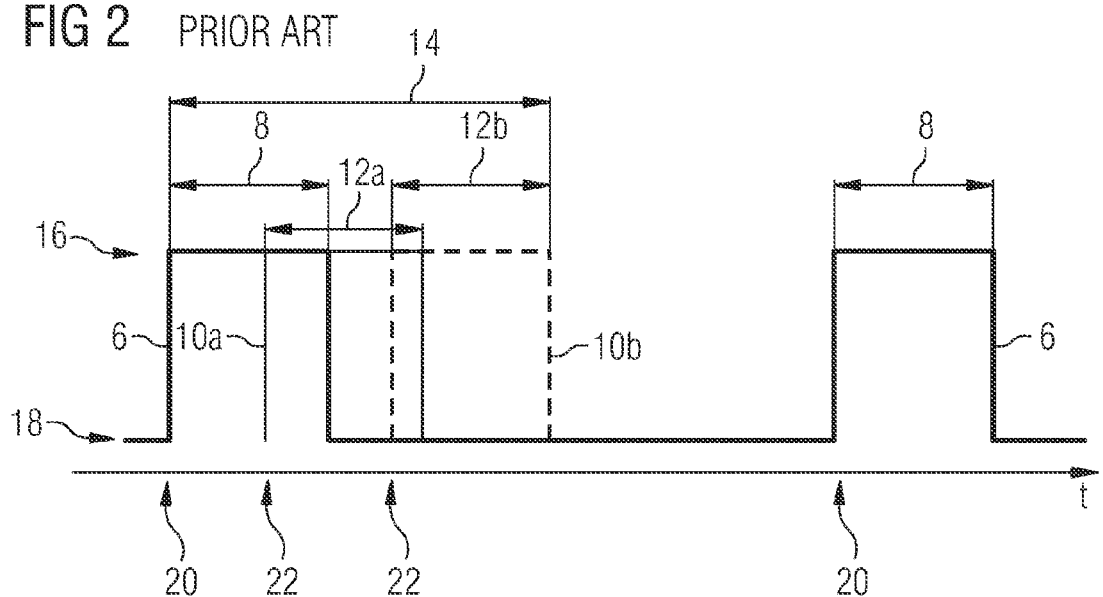
FIG. 2 illustrates on-duration and inactivity timer in a LTE system.

FIG. 2 shows an illustration of on-duration and inactivity timer in a known LTE system.

As illustrated in 3GPP TS 36.300 [2], in the discontinuous reception (DRX) procedure, "when a DRX cycle is configured, the active time includes the time while the on duration timer or the DRX inactivity timer or a DRX retransmission timer or the contention resolution timer is running." In this document, on-duration (on-duration timer), inactivity-timer (DRX inactivity timer) and active-time are the basic concepts in DRX procedures, as defined below. These definitions are also valid for an illustrative embodiment of the herein disclosed subject matter, without being limited to the framework of LTE:

On-duration: duration, e.g. in downlink subframes, that the UE waits for, after waking up from DRX, to receive physical downlink control channels (PDCCHs) which informs the UE about resource allocation. If the UE successfully decodes a PDCCH, the UE stays awake and starts the inactivity timer.

Inactivity-timer: duration, e.g. in downlink subframes, that the UE waits to successfully decode a PDCCH, from the last successful decoding of a PDCCH, failing which it re-enters DRX. The UE shall restart the inactivity timer following a single successful decoding of a PDCCH for a first transmission only (i.e. not for retransmissions).

Active-time: total duration that the UE is awake. This includes the "on-duration" of the DRX cycle, the time UE is performing continuous reception while the inactivity timer has not expired and the time UE is performing continuous reception while waiting for a downlink (DL) retransmission after one HARQ RTT (Hybrid Automatic Repeat reQuest Round Trip Time). Based on the above the minimum active time is of length equal to on-duration, and the maximum is undefined (infinite).

According to an embodiment, the entities of on-duration timer and DRX inactivity timer are given as follows:

On-duration timer: Specifies the number of consecutive PDCCH-subframe(s) at the beginning of a DRX Cycle.

DRX inactivity timer: Specifies the number of consecutive PDCCH-subframe(s) after successfully decoding a PDCCH indicating an initial uplink (UL) or downlink (DL) user data transmission for this UE.

These definitions correspond to the definitions in 3GPP TS 36.321, without being limited to the framework thereof.

FIG. 2 exemplarily illustrates a timing diagram over time t for an on-duration timer 6, defining an on-duration 8, as well as two inactivity timers 10a, 10b defining inactivity time durations 12a, 12b, respectively. Together the on-duration timer 6 and inactivity timers 10a, 10b define the active time 14. In the timing diagram of FIG. 2, the upper level 16 indicates that the UE shall monitor the PDCCH (awake state), whereas the lower level 18 indicates that the UE shall not monitor the PDCCH (sleep state). The beginning of the on-duration 8, indicated at 20 in FIG. 2, is referred to as DRX timeout. The beginnings of the inactivity time durations (inactivity timer active), indicated at 22 in FIG. 2, is referred to as "UE being scheduled" for UL or DL user data transmission.

The concept of on-duration means the period when on-duration timer is running, and the concept of inactivity-timer means the period when DRX inactivity timer is running. Further, the joint operation of on-duration timer and DRX inactivity timer in case a new transmission occurs in on-duration or when DRX inactivity timer is running is given (similar to 3GPP TS 36.321):

According to an embodiment, when DRX is configured, the UE shall for each subframe (wherein SFN is the cell system frame number):
  If the short DRX cycle is used and [(SFN*10)+subframe number] modulo (Short DRX Cycle)=DRX Start Offset; or
  if the long DRX cycle is used and [(SFN*10)+subframe number] modulo (long DRX cycle)=DRX start offset:
    start the on-duration timer.
  if the DRX inactivity timer expires or a DRX Command MAC control element is received in this subframe:
    if the short DRX cycle is configured:
      start or restart the DRX short cycle timer;
      use the short DRX cycle.
    else:
      use the long DRX cycle.
  during the active time, for a PDCCH-subframe except if the subframe is required for uplink transmission for half-duplex FDD UE operation and except if the subframe is part of a configured measurement gap:
    monitor the PDCCH;
    if the PDCCH indicates a new transmission (DL or UL):
      start or restart the DRX inactivity timer.

Now referring to a system with aggregated carriers according to an illustrative embodiment of the herein disclosed subject matter, one PDCCH is provided for signaling the allocations for all component carriers jointly, where the component carrier containing PDCCH is herein referred to as "primary component carrier" and the other component carriers without PDCCH are referred to as "secondary component carrier".

Figure 3:
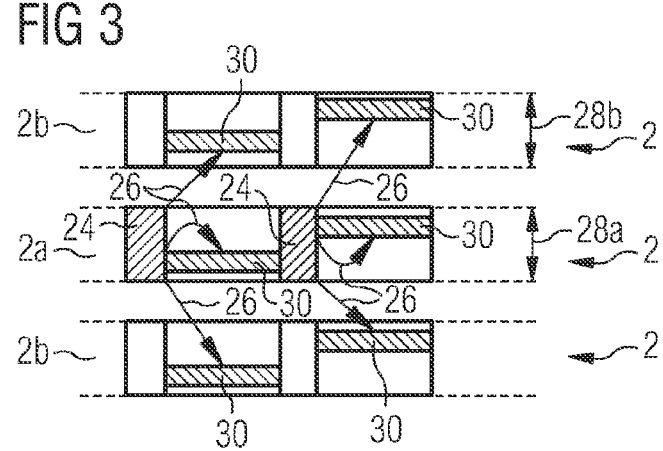
FIG. 3 shows three component carriers including primary component carrier having a joint physical downlink control channel (PDCCH).

FIG. 3 shows one joint PDCCH for all three depicted component carriers 2. It should be understood that the number of component carriers 2 shown in FIG. 3 is only for illustrative purposes can widely vary. In FIG. 3 one primary component carrier 2a and two secondary component carriers 2b are shown. Per definition, the primary component carrier 2a has associated therewith a PDCCH 24 for signaling the allocations for all aggregated component carriers, the signaling being indicated at 26 in FIG. 3. Arrows 28a, 28b indicate the component carrier bandwidth (BW) of primary and secondary component carriers 2a, 2b, respectively. Allocated resources are indicated at 30 in FIG. 3.

According to an illustrative embodiment, generally, on-duration as defined above is configured for the primary component carrier, while the inactivity timer as defined above is configured for both the primary and the secondary component carriers.

In this case, because there is no on-duration on secondary component carrier in this embodiment, the definitions of on-duration and inactivity-timer given above should be adapted as follows to be compatible for both primary and secondary component carriers.

On-duration: duration, e.g. in downlink subframes, that the UE waits for, after waking up from DRX, to receive PDCCHs if configured otherwise to receive downlink data. If the UE successfully decodes a PDCCH, the UE stays awake and starts the inactivity timer on the component carrier(s) where the PDCCH is located and the component carrier(s) where the indicated DL or UL transmission is configured.

Inactivity-timer: duration, e.g. in downlink subframes, that the UE waits to successfully decode a PDCCH, from the last successful decoding of a PDCCH, failing which it re-enters DRX. The UE shall restart the inactivity timer following a single successful decoding of a PDCCH for a first transmission only (i.e. not for retransmissions). These procedures are valid only on the component carrier(s) where the PDCCH is located and the component carrier(s) where the indicated DL or UL transmission is configured.

However, it should be noted that according to other embodiments, other timer configurations are possible.

In the following, two exemplary approaches will be described, each of which embodies various embodiments of the herein disclosed subject matter. Although in each approach a specific combination of embodiments is described, those skilled in the art will readily recognize that other combinations of features are also possible and are realizable within the scope of the appended claims.

A first approach described hereinafter is referred to as "dynamic DRX". Within this approach, it is defined that:

1.1 On-duration exists only on primary component carrier; and 1.2: Inactivity-timer can be started or restarted on a secondary component carrier upon the indication of new transmission in primary component carrier's PDCCH, only within active-time (when either on-duration timer or DRX inactivity timer is running) on the primary component carrier.

The detailed rules for an exemplary implementation of the first approach are as follows:

Rule 1.1: On-duration is configured only on primary component carrier 2a but not on any secondary component carriers 2b. During on-duration, UE is awake monitoring PDCCH on primary component carrier and is sleeping on secondary component carriers.

Rule 1.2: When UE is monitoring PDCCH, if a new transmission is configured on primary component carrier, eNB shall send an indication in the primary component carrier's PDCCH and UE starts or restarts DRX inactivity timer on primary component carrier upon successfully decoding the PDCCH.

Rule 1.3: When UE is monitoring PDCCH, if a new transmission is configured on secondary component carriers, then two options are followed:

If PDCCH on primary component carrier can configure the transmission in the following subframes far away enough to awaken secondary component carrier,
new transmission can be indicated directly by PDCCH at eNB, and UE starts or restarts DRX inactivity timer on both primary and secondary component carriers a gap after successfully decoding the PDCCH, i.e. from the subframe when the data transmission happens.

A gap between PDCCH indication and data transmission needs to be configured by RRC signaling explicitly or used by UE itself implicitly.

Otherwise, if PDCCH on primary component carrier can only configure the transmission in the same subframe,
first, a message (e.g., by MAC control element (CE) or RRC message) is sent by eNB to make UE start the reception on the corresponding secondary component carrier;
secondly, an indication of new transmission in PDCCH is sent a gap after sending the MAC CE/RRC message from eNB, and UE starts or restarts DRX inactivity timer on both primary and secondary component carriers immediately upon successfully decoding the PDCCH.

FIG. 4 shows an exemplary procedure of dynamic DRX design. Three cases are considered therein which correspond to the rules 1.1, 1.2 and 1.3 above. In FIG. 4, a DRX cycle is indicated at 101.

Case 1: If a new transmission happens on primary component carrier then the following steps are performed:

Step 1: for eNB, new transmission indication is sent in primary component carrier's PDCCH 124a, indicating the transmission on primary component carrier 102a; and Step 2: for UE, during active-time on primary component carrier 102a, if a PDCCH indication for primary component carrier is received, DRX inactivity timer is started on primary component carrier in the same subframe. In FIG. 4, the active-time on primary component carrier is not explicitly indicated, but given by the time duration where at least one of the on-duration timer 108 and the inactivity timer 112a is active (respective high levels in FIG. 4).

According to illustrative embodiments of case 1, indicated at d-CS1 in FIG. 4, if a new transmission happens at primary component carrier 102a, then DRX inactivity timer is started in the same subframe.

Case 2: If a new transmission happens on a first secondary component carrier 102b-1 then the following steps are performed:

Step 1: For eNB, a new transmission indication is sent in primary component carrier's PDCCH 124b, indicating the transmission on secondary component carrier 102b-1;

Step 2: for UE, during active-time on primary component carrier 102a, if a PDCCH 124b indication for secondary component carrier 102b-1 is received, a timing gap 132 is used until the reception on secondary component carrier 1 is available (according to an embodiment shown in FIG. 4, the timing gap 132 is between PDCCH indication and data transmission);

Step 3: DRX inactivity timer 112b-1, 112b-2 is started or restarted on both primary component carrier 102a and secondary component carrier 102b-1, respectively.

According to illustrative embodiments of case 2, indicated at d-CS2 in FIG. 4, if a new transmission happens at the first secondary component carrier 102b-1, then a timing gap is needed to guarantee secondary component carrier awake when transmission begins and DRX inactivity timer is started or restarted on both primary and secondary component carriers 102a, 102b-1.

Case 3: If a new transmission happens on a second secondary component carrier 102b-2 then the following steps are performed:

Step 1: for eNB, a MAC CE or RRC message 134 (i.e. a MAC control element) is sent on primary component carrier 102a indicating signal reception on secondary component carrier 102b-2;

Step 2: for eNB, new transmission indication 124c is sent in primary component carrier's PDCCH, indicating transmission on secondary component carrier 102b-2, after a timing gap 138 (i.e. according to an illustrative embodiment, the timing gap 138 extends between the message indicating signal reception on secondary component carrier 102b-2 and the PDCCH indication);

Step 3: for UE, during active-time on primary component carrier 102a, if a PDCCH indication 124c for a secondary component carrier 102b-2 is received, a DRX inactivity timer 112c-1, 112c-2 is started or restarted on both primary and secondary component carriers 102a, 102b-2.

According to illustrative embodiments of case 3, indicated at d-Cs3 in FIG. 4, if a new transmission happens at secondary component carrier 102b-2, then 1) a MAC/RRC message is sent at primary component carrier to awaken secondary component carrier, indicated at 1) in FIG. 4, and 2) a new transmission indication is sent in PDCCH for a transmission to begin, and DRX inactivity timer is started or restarted at both primary and secondary component carriers 102a, 102b-2, indicated at 2) in FIG. 4.

If transmission on multiple secondary component carriers needs to be scheduled, eNB can send indications in PDCCH to start or restart DRX inactivity timer on these secondary component carriers simultaneously.

It should be noted, that the three cases of the first approach indicated above may happen together or separately.

A second approach described hereinafter is referred to as "semi-persistent DRX". Within this approach, it is defined that:

2.1: On-duration exists, i.e. an on-duration timer is defined, on both primary and secondary component carriers, and the range of on-duration on primary component carrier covers all the on-duration on secondary component carriers;

2.2: Inactivity-timer can be started or restarted at a secondary component carrier upon detecting the indication of new transmission in primary component carrier's PDCCH, only within active-time (when either an on-duration timer or a DRX inactivity timer is running) on that secondary component carrier.

The detailed rules for an exemplary implementation of the second approach are as follows:

Rule 2.1: On-duration is configured respectively at both primary and secondary component carriers. The start and the end of on-duration at primary component carrier are no later than the first start and no earlier than the last end of on-duration at secondary component carriers, respectively.

One typical configuration is the pattern that on-durations at secondary component carriers are arranged in sequence and there is no overlapping or gap between any two adjacent ones, as shown in FIG. 5.

On-duration offsets between adjacent secondary component carriers need to be configured by RRC signaling explicitly or known by UEs implicitly.

Rule 2.2: When UE is monitoring PDCCH, if a new transmission is configured at primary component carrier, an indication is sent by eNB in primary component carrier's PDCCH and UE starts or restarts DRX inactivity timer at primary component carrier upon successfully decoding the PDCCH.

Rule 2.3: When UE is monitoring PDCCH and when it is in active-time including on-duration and inactivity-timer on a secondary component carrier, new transmission can be configured at that secondary component carrier. UE starts or restarts DRX inactivity timer on both primary and the secondary component carriers upon successfully decoding the PDCCH.

It is noticed that according to an embodiment the start positions of on-duration, by which inactivity-timer should be followed, are fixed. In this case, if transmission at multiple secondary component carriers needs to be scheduled, eNB should make the active-time of these secondary component carriers overlap by starting or restarting inactivity-timers therein, and then send indications in PDCCH for transmission on these secondary component carriers simultaneously, as shown in FIG. 5.

FIG. 5 shows an exemplary procedure of dynamic DRX design. Three cases are considered therein which correspond to the rules 2.1, 2.2 and 2.3 above. In FIG. 5, a DRX cycle is indicated at 201. On-duration 208a, 208b-1, 208b-2, 208b-3, 208b-4 is configured on the primary component carrier 208a, and the secondary component carriers 208b-1, 208b-2, 208b-3, 208b-4, respectively. In an illustrative embodiment, the offsets 209b-2, 209b-3, 209b-4 of the start/restart of on-duration on a secondary component carrier with regard to the start/restart of the on-duration of the primary component carrier are configured by the network element. According to other embodiments, the offsets of the on-durations of secondary component carriers with regard to start/restart of the on-duration of the primary component carrier may be preconfigured in the UE.

Case 1: If a new transmission happens at primary component carrier 202a, then the following steps are performed:

Step 1: for eNB, a new transmission indication is sent in primary component carrier's PDCCH 224a, indicating the transmission on primary component carrier 202a;

Step 2: for UE, during active-time on primary component carrier 202a, if a PDCCH indication 224a for primary component carrier 202a is received, DRX inactivity timer 212a is started on primary component carrier 202a in the same subframe. In FIG. 5, the active-time on primary component carrier 202a is not explicitly indicated, but given by the time duration where at least one of the on-duration timer 208a and the inactivity timer 212a is active (respective high levels in FIG. 4). It should be noted that no inactivity timer is started on secondary component carrier 202b-1, since no transmission is indicated on this secondary component carrier.

According to illustrative embodiments of case 1, indicated at sp-Cs1 in FIG. 5, if a new transmission happens in primary component carrier 202a, then a DRX inactivity timer 208a is started in the same subframe.

Case 2: If a new transmission happens at secondary component carrier 202b-2, then the following steps are performed:

Step 1: for eNB, a new transmission indication 224b is sent in primary component carrier's PDCCH, indicating the transmission on secondary component carrier 202b-2;

Step 2: for UE, during active-time on secondary component carrier 202b-2, if a PDCCH indication 224b for this secondary component carrier 202b-2 is received, DRX inactivity timer 212b-1, 212b-2 is started on both primary and secondary component carrier 202a, 202b-2 in the same subframe.

According to illustrative embodiments of case 2, indicated at sp-Cs2 in FIG. 5, if a new transmission happens in secondary component carrier 2, then an indication 224b is sent in PDCCH and a DRX inactivity timer 212b-1, 212b-2 is started or restarted at both primary and secondary component carriers 202a, 202b-2 in the same subframe.

Case 3: If a new transmission happens at secondary component carrier 202b-3 and 202b-4 together, then the following steps are performed:

Step 1: for eNB, a new transmission indication 224c is sent in primary component carrier's PDCCH, indicating the transmission on secondary component carrier 202b-3;

Step 2: for UE, during active-time on secondary component carrier 202b-3, if a PDCCH indication 224c for this secondary component carrier 202b-3 is received, DRX inactivity timer 212c-1, 212c-3 is started or restarted on both primary component carrier 202a and secondary component carrier 202b-3 in the same subframe;

Step 3: for eNB, when secondary component carrier 202b-3 and 202b-4 are both in active-time, the indication 224d is sent in primary component carrier's PDCCH for the transmission on these two secondary component carriers 202b-3, 202b-4 together;

Step 4: for UE, during the union of active-time on secondary component carrier 3 and 4, if a PDCCH indication 224d for these two secondary component carriers 202b-3, 202b-4 is received, DRX inactivity timer 212d-1, 212d-3, 212d-4 is started or restarted on both primary component carrier 202a and secondary component carriers 202b-3 and 202b-4 in the same subframe. It should be noted that during reception of the PDCCH indication 224d, both secondary component carriers 202b-3 and 202b-4 are awake, indicated at 240 in FIG. 5.

According to illustrative embodiments of case 3, indicated at sp-Cs3 in FIG. 5, if a new transmission happens in secondary component carriers 202b-3 and 202b-4 together, then 1) a DRX inactivity timer is started at secondary component carrier 202b-3, indicated at 1) in FIG. 5, and
2) an indication 224d is sent in PDCCH for transmission at these two component carriers 202b-3, 202b-4, indicated at 2) in FIG. 5.

It should be noted, that the three cases of the second, semi-persistent DRX approach indicated above may happen together or separately.

In the following, embodiments of the two approaches (dynamic DRX and semi-persistent DRX) are compared regarding RRC signaling, advantages and disadvantages:

A) Configuration by RRC Signaling

According to an embodiment, configuration by RRC signaling for approach 1 (dynamic DRX) comprises configuring a gap between PDCCH indication and data transmission, or a MAC CE/RRC message awaking UE before PDCCH indication.

According to a further embodiment, configuration by RRC signaling for approach 2 (semi-persistent DRX) comprises configuring on-duration offsets on secondary component carriers.

B) Advantages

An advantage of embodiments of approach 1 (dynamic DRX) is that since no on-duration is configured on any secondary component carriers, the power consuming amount can be further decreased.

An advantage of embodiments of approach 2 (semi-persistent DRX) is that since on-duration is configured on every secondary component carrier, no gap between PDCCH indication and data transmission is needed.

C) Disadvantages

A disadvantage of embodiments of approach 1 (dynamic DRX) is that the gap either between PDCCH indication and data transmission or between RRC/MAC message and PDCCH indication is needed, which would result in extra delay.

A disadvantage of embodiments of approach 2 (semi-persistent DRX) is that power consumption amount here is larger than in dynamic DRX design.

FIG. 6 shows a communication system 300 comprising a network element 350 in the form of a base station of a wireless communication system (e-nodeB) and a user equipment 352 in the form of a mobile phone. The network element 350 and the UE 352 each include a transceiver 354a, 354b for establishing a wireless communication channel 356. The wireless communication channel 356 includes a plurality of aggregated component carriers as shown in FIG. 3. In order to perform the respective functions according to the herein disclosed subject matter, the network element 350 comprises a memory 358a for storing a computer program and a processor 360a for running the computer program, thereby carrying out a method according to an network-element related subject matter, e.g. according to the first aspect of the herein disclosed subject matter or an embodiment thereof. Likewise the UE 352 comprises in order to perform the respective functions according to the herein disclosed subject matter, a memory 358b for storing a computer program and a processor 360b for running the computer program, thereby carrying out a UE-related method according to the herein disclosed subject matter, according to the third aspect or an embodiment thereof.

According to embodiments of the invention, any component of the system, e.g. components of the user equipment or components of the network element are provided in the form of respective computer programs which enable a processor to provide the functionality of the respective elements as disclosed herein. According to other embodiments, any component of the user equipment or the network element, e.g. timers may be provided in hardware. According to other—mixed—embodiments, some components may be provided in software while other components are provided in hardware.

As used herein, reference to a computer program is intended to be equivalent to a reference to a program element and/or a computer readable medium containing instructions for controlling a computer system to coordinate the performance of the above described method.

The computer program may be implemented as computer readable instruction code in any suitable programming language, such as, for example, JAVA, C++, and may be stored on a computer-readable medium (removable disk, volatile or non-volatile memory, embedded memory/processor, etc.). The instruction code is operable to program a computer or any other programmable device to carry out the intended functions. The computer program may be available from a network, such as the World Wide Web, from which it may be downloaded.

It should be noted that the term "comprising" does not exclude other elements or steps and the "a" or "an" does not exclude a plurality. Also elements described in association with different embodiments may be combined. It should also be noted that reference signs in the claims should not be construed as limiting the scope of the claims.

In order to recapitulate the above described embodiments of the herein disclosed subject matter one can state:

Two approaches of the herein disclosed subject matter have been disclosed which implement the concept of discontinuous reception DRX on a system capable of carrier aggregation.

According to illustrative embodiments, an exemplary implementation of the dynamic DRX approach comprises the following features:

1.1: On-duration exists only on primary component carrier, with its offset configured by RRC signaling.

1.2: Inactivity-timer can be started or restarted on a secondary component carrier upon detecting successfully decoding a PDCCH indicating an initial UL or DL user data transmission for this secondary component carrier, only within active-time (when either on-duration timer or DRX inactivity timer is running) on the primary component carrier. At the same subframe, inactivity-timer on primary component carrier should also be started or restarted synchronously.

1.3: If PDCCH on primary component carrier can configure the transmission in the following subframes, a timing gap is defined between the indication of PDCCH and the start or restart of inactivity timer, which can be configured by RRC signaling explicitly or known by UEs implicitly.

1.4: If PDCCH on primary component carrier can only configure the transmission in the same subframe, then a two-step signaling from eNB to UE is executed. First, a MAC CE or RRC message is sent on primary component carrier which indicates the preparation of signal reception on a secondary component carrier; second, a PDCCH indication is sent on primary component carrier.

According to illustrative embodiments, an exemplary implementation of the semi-persistent DRX approach comprises the following features:

2.1: On-duration exists on primary and secondary component carriers, and the range of on-duration on primary component carrier covers all the on-duration on secondary component carriers; on-duration offsets of all primary and secondary component carriers need to be configured separately by RRC signaling explicitly or known by UEs implicitly.

2.2: Inactivity-timer can be started or restarted on a secondary component carrier upon successfully decoding a PDCCH indicating an initial UL or DL user data transmission for this secondary component carrier, only within active-time (when either on-duration timer or DRX inactivity timer is running) on that secondary component carrier. At the same subframe, inactivity-timer on primary component carrier should also be started or restarted synchronously.

2.3: One typical configuration is the pattern that on-durations at secondary component carriers are arranged in sequence and there is no overlapping or gap between any two adjacent ones.

2.4: if transmission at multiple secondary component carriers needs to be scheduled, eNB can make the active-time of these secondary component carriers overlap by starting or restarting inactivity-timers therein, and then send indications in PDCCH for transmission on these secondary component carriers simultaneously.

In summary, a communication system is presented, which is capable of sending a transmission over an interface having at least two aggregated component carriers including a primary component carrier and at least one secondary component carrier, wherein the primary component carrier has a physical downlink control channel (PDCCH) associated therewith and wherein the PDCCH is capable of signaling allocations for the primary component carrier and the at least one secondary component carrier. A method of operating a network element comprising sending to a user equipment a transmission indication indicative of the transmission in the PDCCH of the primary component carrier. A method of operating a user equipment comprises monitoring downlink control signaling for a transmission indication indicative of a transmission to the user equipment only on the PDCCH of the primary component carrier.

LIST OF REFERENCE SIGNS 2 component carrier
2a, 102a, 202a primary component carrier
2b, 102b-1, 102b-2, 202b-1, 202b-2, 202b-3, 202b-4 secondary component carrier
4 aggregated bandwith
6, 8, 108, 208a, 208b-1, 208b-2, 208b-3, 208b-4 on-duration timer/on-duration
10a, 10b, 12a, 12b, 112a, 112b-2, 112c-2, 212a, 212b-1, 212b-2, 212c-1, 212c-3, 212d-1, 212d-3, 212d-4 inactivity timer/inactivity time duration
14 active time
16 upper level
18 lower level
20 start of on-duration
22 start/restart of inactivity timer
24, 124a, 124b, 124c, 224a, 224b, 224c, 224d physical downlink control channel (PDCCH)
26 signaling
28a, 28b component carrier bandwidth
30 resource
101, 201 DRX cycle
132 gap between PDCCH indication and data transmission
134 MAC/RRC message, e.g. MAC control element
138 gap between MAC/RRC message and PDCCH indication
209b-2, 209b-3, 209b-4 offset of the start/restart of on-duration on a secondary component carrier with regard to the start/restart of the on-duration of the primary component carrier
240 indication that both component carriers are awake
300 communication system
350 network element
352 user equipment (UE)
354a, 354b transceiver
356 channel
358a, 358b memory
360a, 360b processor
C1, C2, C3, C4, C5: component carrier
d-CS1, d-CS2, d-CS3: case 1, case2, case 3 of a dynamic DRX approach
sp-CS1, sp-CS2, sp-CS3: case 1, case2, case 3 of a semi-persistent DRX approach

The invention claimed is:

1. A method comprising:
sending to a user equipment a transmission indication indicative of a transmission to be sent by a network element over an interface comprising at least two aggregated component carriers including a primary component carrier and at least one secondary component carrier;
if the physical downlink control channel on the primary component carrier is capable of configuring the transmission in the following subframes of the primary component carrier and at least one secondary component carrier, signaling to the user equipment a timing gap message for configuring the user equipment to impose a timing gap between successful decoding of the transmission indication and starting of an inactivity timer on a secondary component carrier, the inactivity timer indicating the minimum waiting time duration for the UE until deactivating reception on the component carrier associated with the inactivity timer;
wherein the primary component carrier has a physical downlink control channel associated therewith;
wherein the physical downlink control channel is configured to signal allocations for the primary component carrier and the at least one secondary component carrier; and
wherein the transmission indication is sent to the user equipment in the physical downlink control channel of the primary component carrier.

2. The method according to claim 1, further comprising:
signaling offsets of on-duration of the primary component carrier and the at least one second component carrier, the on-duration indicating the time duration the user equipment monitors the physical downlink control channel for allocations or stays awake for possible downlink data transmission.

3. A network element configured for carrying out the method according to claim 1.

4. A method comprising:
controlling a user equipment to receive a transmission over an interface comprising at least two aggregated component carriers including a primary component carrier and at least one secondary component carrier;
if the physical downlink control channel on the primary component carrier is capable of configuring the transmission in the following subframes of the primary component carrier and at least one secondary component carrier, configuring the user equipment to impose a timing gap between successful decoding of the transmission indication and starting of an inactivity timer on a secondary component carrier, the inactivity timer indicating the minimum waiting time duration for the user equipment until deactivating reception on the component carrier associated with the inactivity timer;
wherein the primary component carrier has a physical downlink control channel associated therewith;
wherein the physical downlink control channel is configured to signal allocations for the primary component carrier and the at least one secondary component carrier; and
wherein the transmission indication is sent to the user equipment in the physical downlink control channel of the primary component carrier.

5. The method according to claim 4, wherein the user equipment is capable of receiving the transmission on at least one secondary component carrier in a following subframe which follows a subframe in which the transmission indication was sent, the method further comprising:
imposing a timing gap between successful decoding of the transmission indication and starting of an inactivity timer, the inactivity timer indicating the minimum duration that the user equipment waits before deactivating reception on the component carrier associated with the inactivity timer.

6. The method according to claim 5, wherein
the timing gap is defined by one of the following: a timing gap message transmitted by a network element; and a timing gap duration value stored in the user equipment.

7. The method according to claim 4, wherein only the primary component carrier is configured with an on-duration timer defining a time duration during which the user equipment monitors the physical downlink control channel for allocations.

8. The method according to claim 4, wherein the primary component carrier and at least one of the at least one secondary component carrier is configured with an on-duration timer defining a time duration during which the user equipment monitors the physical downlink control channel for allocations or stays awake for possible downlink data transmission, wherein the range of on-duration on the primary component carrier covers all on-duration ranges of on-duration on the at least one secondary component carrier.

9. The method according to claim 4, further comprising:
starting an inactivity timer on a secondary component carrier only within an active time on the secondary component carrier, upon the successfully decoding of a physical downlink control channel;
the inactivity timer indicating the time duration the user equipment at least waits until deactivating reception on the component carrier associated with the inactivity timer;
wherein the active time indicates the time duration including on-duration and inactivity timer.

10. A computer readable medium storing a program of instructions, execution of which by a processor configures an apparatus to at least:
send to a user equipment a transmission indication indicative of a transmission to be sent by a network element over an interface comprising at least two aggregated component carriers including a primary component carrier and at least one secondary component carrier;
if the physical downlink control channel on the primary component carrier is capable of configuring the transmission in the following subframes of the primary component carrier and at least one secondary component carrier, signal to the user equipment a timing gap message for configuring the user equipment to impose a timing gap between successful decoding of the transmission indication and starting of an inactivity timer on a secondary component carrier, the inactivity timer indicating the minimum waiting time duration for the UE until deactivating reception on the component carrier associated with the inactivity timer; and
send to the user equipment a reception preparation message indicating a requirement to prepare at least one secondary component carrier for signal reception thereon;
wherein the primary component carrier has a physical downlink control channel associated therewith;
wherein the physical downlink control channel is configured to signal allocations for the primary component carrier and the at least one secondary component carrier;

wherein the transmission indication is sent to the user equipment in the physical downlink control channel of the primary component carrier.

11. An apparatus comprising:
at least one processor;
memory storing computer program code;
wherein the memory storing the computer program code is configured to, with the at least one processor, cause the apparatus to at least:
control a user equipment to receive a transmission over an interface comprising at least two aggregated component carriers including a primary component carrier and at least one secondary component carrier;
if the physical downlink control channel on the primary component carrier is capable of configuring the transmission in the following subframes of the primary component carrier and at least one secondary component carrier, configure the user equipment to impose a timing gap between successful decoding of the transmission indication and starting of an inactivity timer on a secondary component carrier, the inactivity timer indicating the minimum waiting time duration for the UE until deactivating reception on the component carrier associated with the inactivity timer;
control the user equipment to monitor downlink control signaling for a transmission indication indicative of a transmission to the user equipment only on the physical downlink control channel of the primary component carrier;
wherein the primary component carrier has a physical downlink control channel associated therewith;
wherein the physical downlink control channel is configured to signal allocations for the primary component carrier and the at least one secondary component carrier;
wherein the physical downlink control channel is not capable of configuring the transmission in the following subframes; and
wherein the transmission indication is sent to the user equipment in the physical downlink control channel of the primary component carrier.

12. The apparatus according to claim 11, wherein the user equipment is capable of receiving the transmission on at least one secondary component carrier in a following subframe which follows a subframe in which the transmission indication was sent, and wherein the apparatus is further caused to:
impose a timing gap between successful decoding of the transmission indication and starting of an inactivity timer, the inactivity timer indicating a minimum duration that the user equipment waits before deactivating reception on the component carrier associated with the inactivity timer.

13. The apparatus according to claim 12, wherein
the timing gap is defined by one of the following: a timing gap message transmitted by a network element; and a timing gap duration value stored in the user equipment.

14. The apparatus according to claim 11, wherein only the primary component carrier is configured with an on-duration timer defining a time duration during which the user equipment monitors the physical downlink control channel for allocations.

15. The apparatus according to claim 11, wherein the primary component carrier and at least one of the at least one secondary component carrier are each configured with an on-duration timer defining a time duration during which the user equipment monitors the physical downlink control channel for allocations or stays awake for possible downlink data transmission, wherein the range of on-duration on the primary component carrier covers all on-duration ranges of on-duration on the at least one secondary component carrier.

16. The apparatus of claim 15, wherein the apparatus is further caused to:
start an inactivity timer on a secondary component carrier only within an active time on the secondary component carrier, upon the successfully decoding of a physical downlink control channel;
wherein the inactivity timer indicates the minimum time duration that the UE waits before deactivating reception on the component carrier associated with the inactivity timer;
wherein the active time indicating the time duration includes on-duration and inactivity timer.

17. The method according to claim 1, further comprising, if the physical downlink control channel on the primary component carrier is not capable of configuring the transmission in the following subframes of the primary component carrier and at least one secondary component carrier, sending to the user equipment a reception preparation message indicating a requirement to prepare at least one secondary component carrier for signal reception thereon, and sending the transmission indication on the primary component carrier.

18. The method according to claim 4, further comprising, if the physical downlink control channel on the primary component carrier is not capable of configuring the transmission in the following subframes of the primary component carrier and at least one secondary component carrier, configuring the user equipment to prepare at least one secondary component carrier for signal reception thereon, and sending the transmission indication on the primary component carrier.

19. The computer readable medium according to claim 10, wherein the apparatus is further configured to, if the physical downlink control channel on the primary component carrier is not capable of configuring the transmission in the following subframes of the primary component carrier and at least one secondary component carrier, configuring the user equipment to prepare at least one secondary component carrier for signal reception thereon, and sending the transmission indication on the primary component carrier.

20. The apparatus according to claim 11, wherein the apparatus is further caused to, if the physical downlink control channel on the primary component carrier is not capable of configuring the transmission in the following subframes of the primary component carrier and at least one secondary component carrier, configuring the user equipment to prepare at least one secondary component carrier for signal reception thereon, and sending the transmission indication on the primary component carrier.

* * * * *